Oct. 24, 1944.   W. J. MUNDY   2,360,968
EXPANSIBLE MANDREL
Filed Aug. 4, 1943
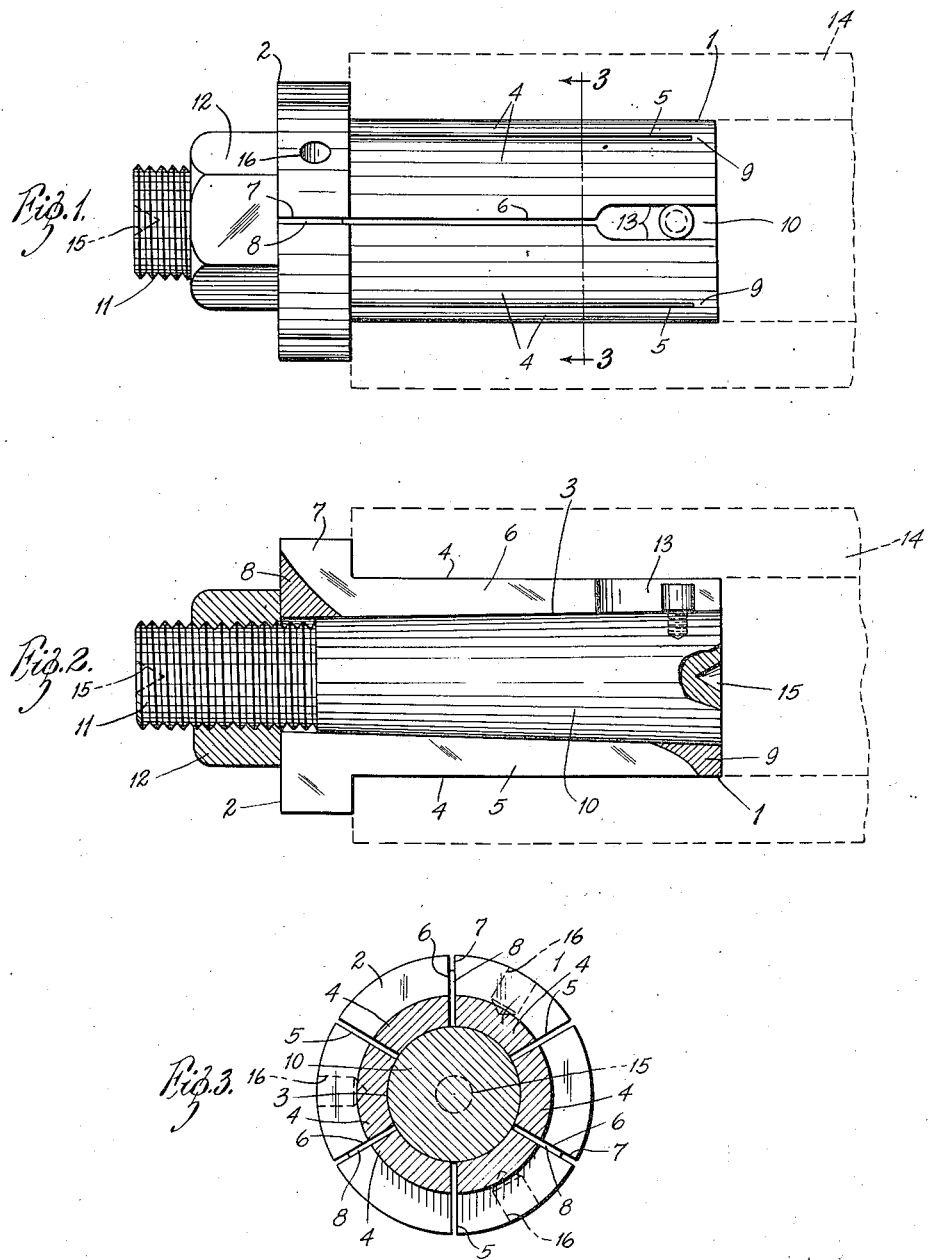
INVENTOR:
William J. Mundy,
by Carr Kerr & Gravely,
HIS ATTORNEYS.

Patented Oct. 24, 1944

2,360,968

UNITED STATES PATENT OFFICE 2,360,968

EXPANSIBLE MANDREL

William J. Mundy, St. Louis County, Mo., assignor to C. T. Small Manufacturing Company, St. Louis County, Mo., a corporation of Missouri Application August 4, 1943, Serial No. 497,393

2 Claims. (Cl. 82—44)

My invention relates to expanding mandrels, particularly to mandrels of the type to be inserted in each end of hollow work whereby it may be rotatably held while in a lathe or other machine. The invention has for its principal object an expanding mandrel which is easily inserted in the work, in which the expansion and contraction of the mandrel are easily produced, in which the expansion is substantially uniform throughout the length of the mandrel and which is simple and durable in construction.

The invention consists principally in a hollow internally tapered mandrel body and a tapered expander pin therefor, the mandrel body being provided with two sets of longitudinal slits extending alternately from opposite ends of the mandrel almost to the other end. The invention further consists in the expanding mandrel and in the parts and combinations and arrangements of parts hereinafter described and claimed.

In the accompanying drawing,

Fig. 1 is a top plan view of an expanding mandrel embodying my invention,

Fig. 2 is a longitudinal sectional view; and

Fig. 3 is a cross-sectional view on the line 3—3 of Fig. 1.

The hollow mandrel body 1 has a peripheral rib 2 at one end thereof and a bore 3 that tapers toward said ribbed end 2. The mandrel body 1 is provided with sets of longitudinal slits arranged in alternation and dividing the body into a plurality of strips or sections 4 connected only at their ends.

One set of slits 5 extend through the rib 2 and the body almost to the end of the body opposite said rib. The other set of slits 6 extend from the end of the body opposite said rib, through the body and their end portions 7 extend partially into the outer portion of said rib 2. Thus, the body is free to expand even at the ribbed end 2 and the masses of solid metal 8 connecting strips 4 at the ribbed end of said body are substantially the same size as those 9 connecting strips 4 of the body at the end opposite said rib, so that the resistance to expansion is substantially the same at both ends of the mandrel body and the expansion will be substantially uniform throughout the length of the body.

Mounted in the body is a tapered expander pin 10 which has its smaller end 11 threaded and projecting beyond the rib 2 on the body. A nut 12 on said threaded end of said pin engages the face of said rib 2 and tightening said nut causes said expander pin 10 to be drawn into the body, thus expanding said body. A stud on said pin extending into a widened portion 13 of one of said slits prevents rotation of said pin in the mandrel body. The end portion 7 of the mandrel body may be provided with holes 16 for a spanner wrench for holding said body while the nut 12 is being tightened to expand the mandrel.

Ordinarily, these mandrels will be used in pairs, one in each end of the tubular work, the inner face of the rib of each mandrel engaging an end of the work. A tubular work piece 14 is indicated in dotted lines. Obviously, however, one of these expanding mandrels may be used with some other form of mandrel, or may be used for supporting hollow work shorter than the mandrel itself. The ends of the pin 10 are provided with conical axial depressions 15 for cooperating with a suitable center or work support.

The above described mandrel is simple and durable in construction, it is easy to position in and remove from the work and to expand and contract. It expands uniformly throughout its length and is capable of a substantial amount of expansion.

What I claim is:

1. An expansible mandrel comprising a tubular body having an external peripheral rib at one end and having two alternating series of longitudinal slots, the slots of one series extending completely through said rib and terminating short of the end of said body remote from said rib and the slots of the other series starting at the end of said body remote from said rib and extending throughout said body and partly into said rib whereby the masses of metal between slots are of substantially the same size at both ends of said mandrel.

2. An expansible mandrel comprising a tubular body having an external peripheral rib at one end and having two alternating series of longitudinal slots, the slots of one series extending completely through said rib and terminating short of the end of said body remote from said rib and the slots of the other series starting at the end of said body remote from said rib and extending throughout said body and partly into said rib whereby the masses of metal between slots are of substantially the same size at both ends of said mandrel, the bore of said body being tapered, with its smallest diameter at said ribbed end, a tapered spreader pin in said bore with its smaller end threaded and projecting beyond the end of said body and a nut on said threaded end of said pin seating against the face of said rib.

WILLIAM J. MUNDY.